US007051667B2

(12) United States Patent
Scotti

(10) Patent No.: US 7,051,667 B2
(45) Date of Patent: May 30, 2006

(54) PROTECTION AND FINISH STRUCTURE FOR THE HULL CONTOUR OF A BOAT

(75) Inventor: Marino Douglas Scotti, Milan (IT)

(73) Assignee: Douglas Marine S.r.L., Milan (IT)

( * ) Notice: Subject to any disclaimer, the term of this patent is extended or adjusted under 35 U.S.C. 154(b) by 0 days.

(21) Appl. No.: 10/711,249

(22) Filed: Sep. 3, 2004

(65) Prior Publication Data

US 2005/0199170 A1     Sep. 15, 2005

(30) Foreign Application Priority Data

Mar. 12, 2004   (EP)   ................... 04425171

(51) Int. Cl.
*B63B 1/00*   (2006.01)
(52) U.S. Cl. ...................... 114/219; 293/126
(58) Field of Classification Search .............. 114/219; 248/345.1; 293/155, 126; 428/31
See application file for complete search history.

(56) References Cited

U.S. PATENT DOCUMENTS 4,083,592 A * 4/1978 Rubin et al. ............ 52/717.05
6,349,662 B1   2/2002 Limansky et al. .......... 114/219
6,863,009 B1 * 3/2005 Driver ...................... 114/219
2004/0016383 A1   1/2004 Aschenbach ............... 114/219

FOREIGN PATENT DOCUMENTS

| AU | 534 728 | 3/1984 |
| GB | 2 088 524 A | 6/1982 |
| GB | 2 183 887 A | 6/1987 |

* cited by examiner

*Primary Examiner*—Jesus D. Sotelo
(74) *Attorney, Agent, or Firm*—Seed IP Law Group PLLC

(57) ABSTRACT

The present invention relates to a protection and finish structure of the border of a boat hull with simplified assembly, of the type comprising a profile being extended in a longitudinal direction and a plurality of fixing means for fixing the profile to the hull, distributed along said profile. The fixing means of the structure comprise at least a fast clutch with a tenon and mortise joint wherein a tenon element, fixed to the profile, and a mortise element, intended for being fixed to the hull, have respective tenons and mortise being mutually engaged in a longitudinally sliding way.

24 Claims, 4 Drawing Sheets

_US 7,051,667 B2_

PROTECTION AND FINISH STRUCTURE FOR THE HULL CONTOUR OF A BOAT

BACKGROUND OF THE INVENTION

The present invention relates to a protection and finish structure for the hull contour of a boat, with simplified assembly and particular aesthetic value. More specifically the invention relates to a structure of the above type and comprising a profile extended in a longitudinal direction and a plurality of fixing means, for fixing the molding to the hull, distributed along said molding. The invention particularly, but not exclusively, relates to a profile of stainless steel for finishing the contour of valuable boats and the following description is made with reference to this field of application for convenience of illustration only.

DESCRIPTION OF THE RELATED ART

As it is well known in this specific technical field of boating, boat hulls are perimetrically equipped with a protecting and finishing molding, which can be extended along the border of the boat, possibly with the only exception of the stern area.

In the most common yachting boats this molding is called "rubbing strake" and it comprises a support groove longitudinally fixed to the border of the boat, and an insert housed inside the groove and having a shock-resistant function.

In boats of great value this molding comprises a metallic profile, for example of stainless steel, having slightly arch-like sections, performing the double function of fender protection and finish effective to confer aesthetic value to the boat.

The known technique teaches to assemble this steel profile on a longitudinal support made of a PVC section fixed to the border of the boat.

The PVC support section is fixed to the boat by means of simple self-threading screws provided in a predetermined spaced relation with each other.

Similarly, the stainless steel profile is attached to the PVC support by means of self-threading screws, which pass through corresponding holes longitudinally and centrally provided along the profile and which are screwed in the support taking care of alternating them with the fixing screws of the support itself, in order to avoid possible overlappings.

Although advantageous under several aspects, this fixing mode has various drawbacks, the first of which is the fact that it requires a certain care and precision in the shipyard during the assembling steps of the stainless steel profile.

Moreover, the plurality of holes provided in the stainless steel profile for the passage of the fixing screws decreases the aesthetic impact of the stainless steel profile, further decreased by the plurality of screw heads emerging from the corresponding plurality of holes.

Despite all the care employed during the assembling steps, it may also happen that one or more screw heads is badly housed and partially emerges from the seat made by the corresponding hole of the steel profile, which may be very dangerous for the boat users.

It is also to be noted that the plurality of holes regularly arranged along the steel profile weaken the profile itself, which, during the assembling steps implying its adhesion in longitudinal direction to the convex border of the hull, can cause unaesthetic bendings exactly in correspondence of one or more holes.

Up to now, the prior art has not proposed any alternative solution for fixing the finish metallic profile to the border of the boat.

Within this ambit, it must also be considered that the border of a boat is convex and that the adhesion of the metallic profile to the PVC support must be particularly firm and safe since the bending to which the profile is subjected during the assembling and adhesion step to the border stimulates the release of the profile itself.

The technical problem underlying the present invention is that of devising a protection and finish structure of the border or of the contour of a boat hull, having such structural and functional characteristics as to allow an extremely simplified assembly of the protecting and finishing metallic profile overcoming the limitations and/or drawbacks of the structures realized according to the prior art.

BRIEF SUMMARY OF THE INVENTION

The solution idea at the basis of the present invention is that of associating respective snap or connection elements with the finishing and support elements of the protection structure, which allow an individual to assemble, by a simple manual clutch, the finish profile on the support with possibility of side release.

A first embodiment of the invention relates to a protection and finish structure for the border of a boat hull, comprising:

a profile extended in a longitudinal direction;

a plurality of fixing means for fixing the profile to the hull, said means being distributed along said profile and comprising:

at least a connection with a tenon and mortise joint including a tenon element, fixed to said profile, and a mortise element, intended for being fixed to the hull; said tenon element and said mortise element having respective tenons and mortises being mutually engaged in a longitudinally sliding manner, thus obtaining a simplified assembly of the protection structure.

BRIEF DESCRIPTION OF THE DRAWINGS

The features and advantages of a protection structure according to the invention are made apparent by the following description of an embodiment thereof, given by way of non-limiting example with reference to the accompanying drawings.

In the drawings.

DETAILED DESCRIPTION OF THE INVENTION

Figure 1:
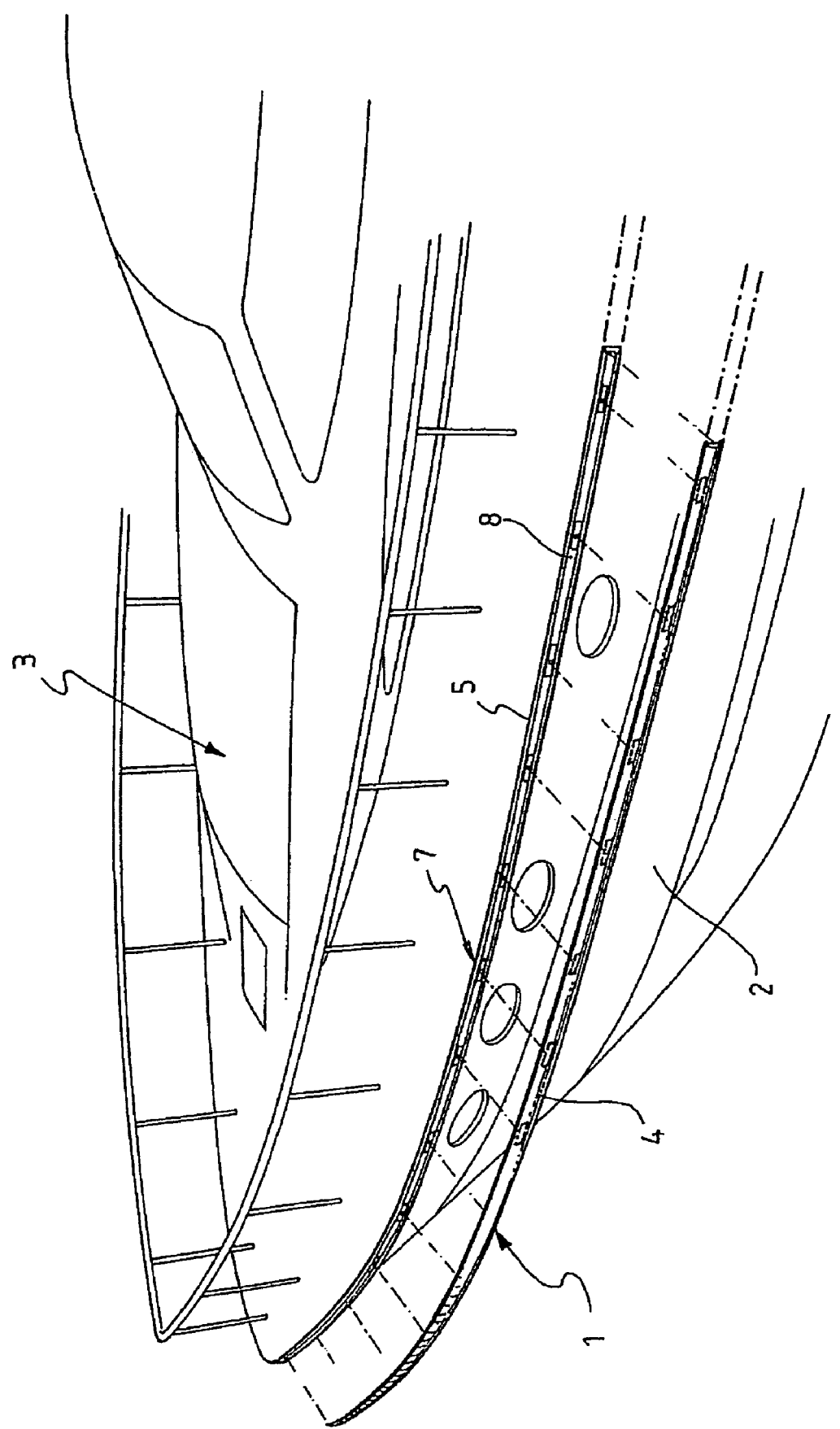
FIG. 1 shows a perspective and schematic view of a portion of a boat equipped with a protection and finish structure according to an embodiment of the present invention and shown in an exploded way.

With reference to FIG. 1, reference number 1 globally and schematically indicates a protection and finish structure of the border 5 or of the contour of a hull 2 of a boat 3, according to the present invention.

The structure 1 comprises a molding or profile 4 extended longitudinally along the border 5 of the hull 2.

The illustrated profile 4 is made of metallic material and preferably stainless steel. This profile 4 has a slightly arch-like section and a surface at sight, being homogeneous and uniform, absolutely devoid of holes.

Obviously, nothing prevents the profile 4 from having a cutaway shape of different type, i.e., with straight tracts rather than flat.

The illustrated profile 4 is assembled on a basement or longitudinal support 8 comprising a section of synthetic material being constrained to the border 5 of the hull 2 by means of fixing screws 21 (FIG. 2) regularly spaced, as it will be hereafter described. The basement 8 can be a thermoformed material and preferably with a PVC extrusion.

A plurality of fixing means 7 are provided for the simplified connection assembly of the profile 4 on the longitudinal support 8. These means 7 along said molding 4, but nothing forbids that they can be provided with irregular alternation.

Figure 2:
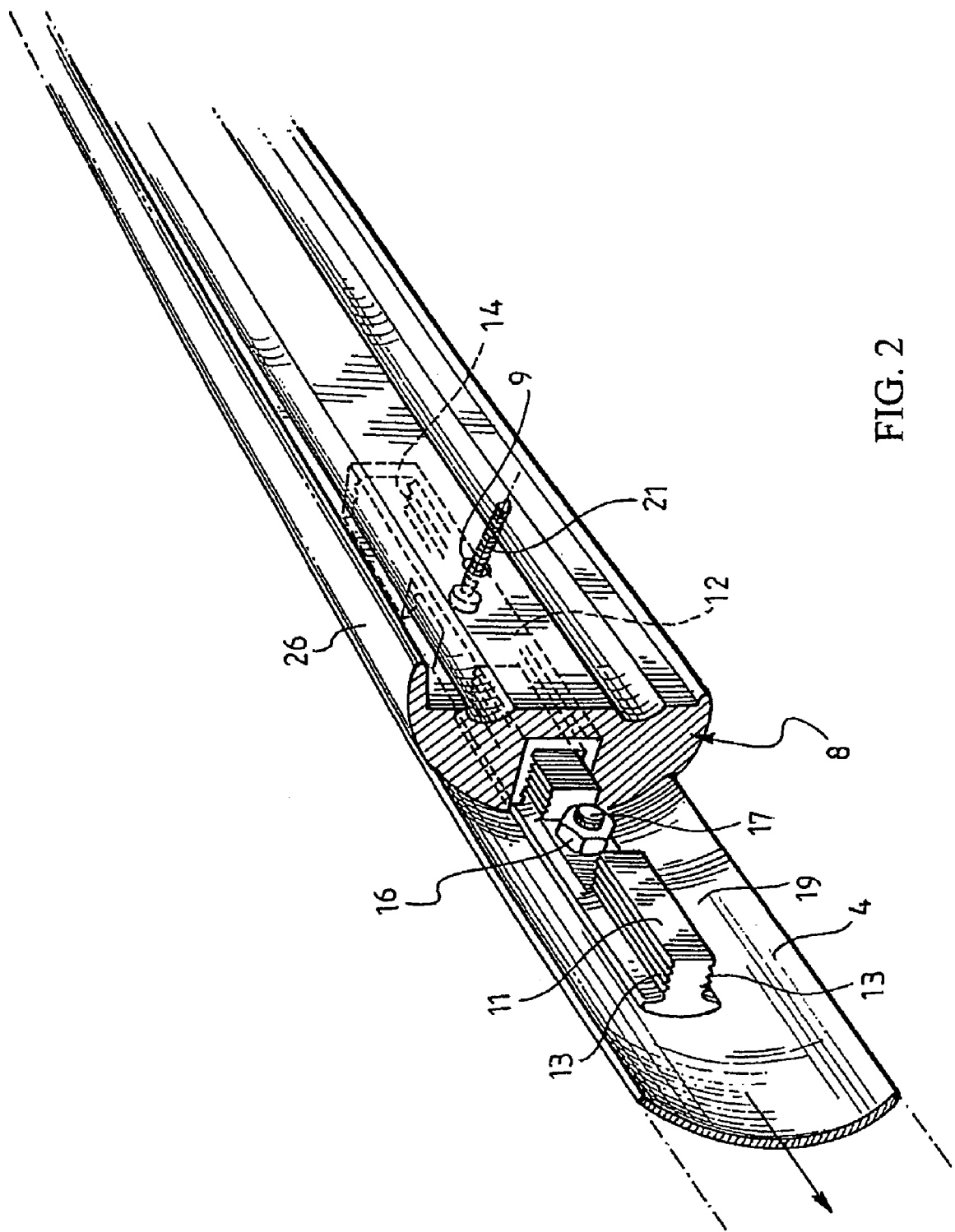
FIG. 2 shows a partial section perspective view of the protection structure of FIG. 1.

Advantageously, as best illustrated in FIG. 2, the above fixing means 7 comprise at least a connection with a tenon and mortise joint 10 (FIG. 3) wherein a tenon element 11 is fixed to said profile 4 and a mortise element 12 is intended for being fixed to the hull 2. More in particular, the mortise element 12 is associated with the basement 8 being constrained to the border 5 of the hull 2.

Figure 3:
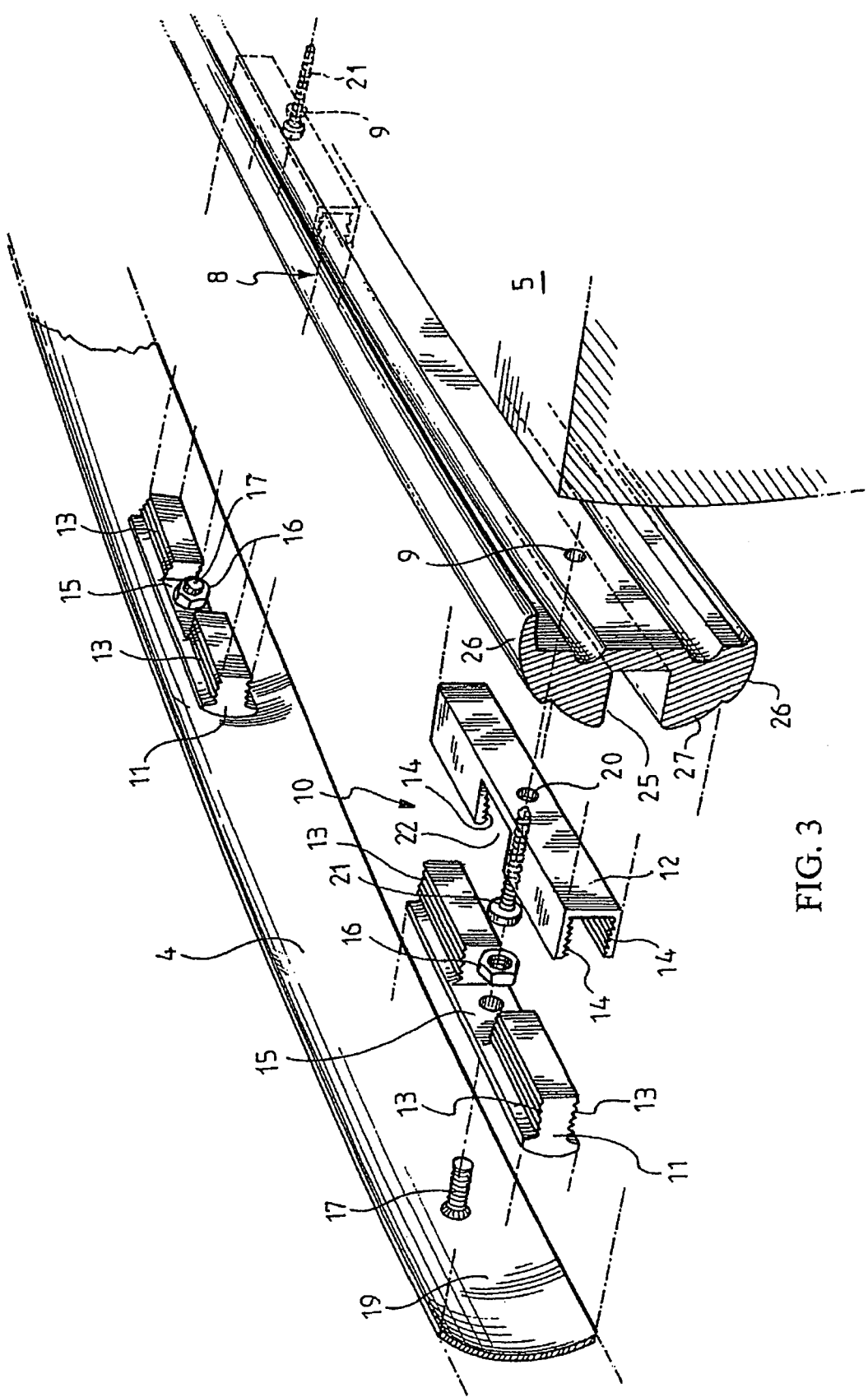
FIG. 3 shows a perspective exploded view of the structure of FIG. 2.

More in particular, as best illustrated in FIG. 3, the basement 8, longitudinally extended, comprises a longitudinal groove 25 for receiving the mortise element 12.

As it is well shown in the figures, several fixing means 7 are preferably provided being regularly spaced from one another along the profile 4 and the basement 8.

The elements 11 and 12 have respective tenons and mortise being mutually engaged in a longitudinally sliding way. The tenon of the tenon element 11 and the mortise of the mortise element 12 can be mutually coupled, like buttons or snappily by pressure, in a direction being perpendicular to the longitudinal one.

To this aim, the tenon has a section with saw-tooth shaped sides 13 and the mortise has a section with similarly shaped sides 14, substantially conjugated to the section of the tenon.

The tenon element 11 is a substantially parallelepiped block being longitudinally extended for a predetermined and limited length, for example about 50 mm.

This block comprises a hollow area 15 for housing a nut 16 for a fixing stud 17 of the tenon element constrained by welding on the inner surface 19 of the profile 4, i.e., the surface facing the basement 8.

The mortise element 12 is a crop of a substantially C-like section longitudinally extended for a predetermined and limited length, substantially corresponding to that of the conjugated tenon element 11. This crop of a substantially C-like section comprises a hole 20 for the passage of a fixing screw 21 of the crop to said basement 8.

Advantageously, the screw 21 is long enough also to allow the basement 8 to be fixed on the border 5 of the hull 2 through a hole 9, but caused in this case by the only passage of the self-threading screw 21. In this way, during the assembly of the structure according to the invention, and in particular during a housing of the mortise blocks 12 into the groove 25, it is possible to fix by means of a single operation both the basement 8 to the border 5 and the mortise blocks 12 into the groove 25. Also the section crop of the mortise 12 provides a central hollow area 22, in correspondence with the hole 20.

The tenon element 11 and the mortise element 12 are preferably made of nylon and the presence of the respective hollow areas 15 and 22 allows to make these elements more easily adaptable to the curve taken by the profile 4 in the coupling with the basement 8 and with the convex border 5 of the hull 2.

Moreover, the hollow area 15 embeds the fixing nut 16 of the tenon element 11 to the profile 4, whereas the hollow area 22 embeds the screw head 21 so that the nuts 16 and the screws 21 never interfere under any operative condition.

Figure 4:
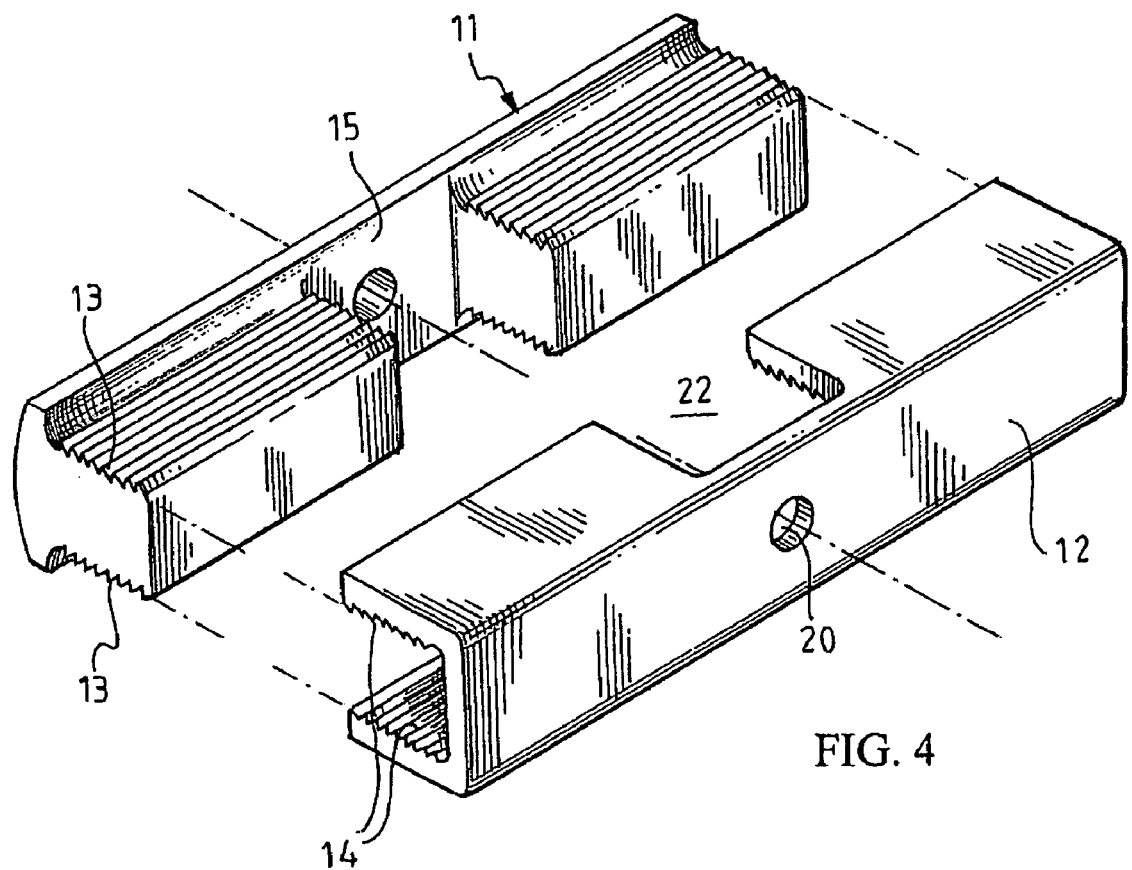
FIG. 4 shows a perspective view of a detail of the structure according to the invention.

As best illustrated in FIG. 4, each tooth of profile 13 has back and front faces; just as each tooth of profile 14 has back and front faces. The respective back faces are suitable for the snap insertion of the tenon 11 into the mortise 12, whereas the front faces are adapted for the retention of the tenon in the mortise substantially with a traction resistance not lower, possibly higher, than that offered by the fixing screws of the prior art.

The teeth have reduced sizes and their number is relatively high, for example they have a thin pitch of 1 mm and they are preferably more than six.

If the assembling requirements need it, a snappily engagement with a pitch progression can occur due to the mutual pressure and according to the number of the meshed teeth, from a minimum of only one meshed tooth to a maximum of all the teeth being meshed.

It is to be noted that, when it happens that all the teeth are meshed, a slight shrinking of the profile 4 against the basement 8 occurs, but, thanks to the elasticity of the nylon tenon, an elimination of any possible clearance during operation between the profile 4 and the basement 8 is obtained.

Advantageously, the engagement between tenon and mortise can manifest along all the length of the elements 11 and 12, i.e., for about 50 mm, or for a single tract of their longitudinal extension, for example for 40 mm, this can occur for example when there is no precise overlapping between tenon and mortise.

Figure 5:
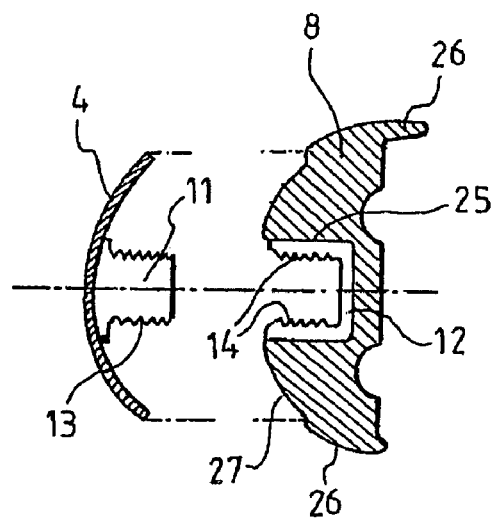
FIGS. 5 and 6 show respective sectional views of the structure according to the invention during an assembling step and under operating conditions, respectively.
Figure 6:
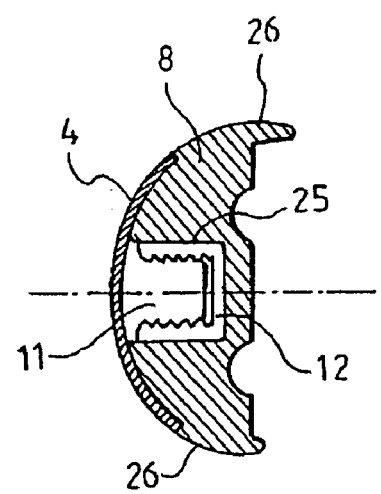

As best seen in FIGS. 5 and 6, the basement 8 has an extruded profile having an arch 27 of predetermined width conjugated with the curve of the inner surface of the profile 4, and adjacent arch-like portions 26 as extension of the outer profile of the profile 4, a step being formed between the two portions, having height roughly equal to the thickness of the molding 4.

It is also to be noted that the mortise element 12 has such a round end surface with predetermined curve as to be conjugated to the inner curve of the surface 19 (FIG. 3) of the profile 4.

From the previous description it is clear that the protection and finish structure according to the invention solves the technical problem and several advantages are gained the first of which is given by the fact that the assembly of the finish metallic profile on the longitudinal basement associated with the border of the boat can occur by means of an easy manual snappily clutch.

The coupling ensured by the plurality of tenon and mortise elements being uniformly distributed along the inner surface of the profile 4 and along the groove 25 of the basement 8 confers a suitable strength to the assembly of the profile and of the PVC basement, which can be a fender protection for the hull 2.

The mutual engagement between the saw-tooth knurl of tenon and mortise ensures a firm coupling also in those situations wherein the insertion depth of the tenon into the mortise is limited to a few teeth.

Moreover, the engagement between tenon and mortise can manifest for all the length of the relevant elements 11 and 12, but also for a partial tract of their longitudinal extension, for example when there is not a precise overlapping between tenon and mortise.

Also the possible disassembling steps, which would become necessary for any reason, are easily performed by means of a side sliding of the profile 4 on the basement 8 with relevant unhooking and release between the tenon and mortise elements of the fixing means 7.

Finally, it is worth noting that the peculiar conformation of the blocks of the tenon 11 and mortise 12 elements, provided with central hollow area, is easily adaptable to the curve taken by the profile 4 in the coupling with the basement 8 and with the convex border 5 of the hull 2.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A protection and finish structure for a boat hull, of the type comprising:
   a profile extended in a longitudinal direction;
   a longitudinally extended base configured for being fixed to the hull and having a longitudinal groove; and
   a tenon and mortise joint having a tenon element and a mortise element, one of them being fixed to the profile and being longitudinally extended for a limited preselected length and the other of them being adapted for being received within the groove of the base and being longitudinally extended for a limited preselected length, wherein the tenon element and the mortise element have respective limited preselected lengths and spaces therebetween for being mutually disengageable by sliding the profile with respect to the base in the longitudinal direction.

2. The protection structure according to claim 1 wherein the tenon element and the mortise element are configured to be mutually coupled by pressure applied in a direction perpendicular to the longitudinal direction.

3. The protection structure according to claim 2 wherein the tenon has a section with saw-tooth shaped sides and the mortise has a section with saw-tooth shaped sides, substantially conjugated to the section of the tenon.

4. The protection structure according to claim 3 wherein the tenon element is a substantially parallelepiped block being longitudinally extended for a predetermined and limited length.

5. The protection structure according to claim 4 wherein the substantially parallelepiped block comprises a hollow area for housing a nut for a stud for fixing the tenon element to an inner surface of the profile.

6. The protection structure according to claim 4 wherein the mortise element is a crop of a substantially C-like section being longitudinally extended for a predetermined and limited length.

7. The protection structure according to claim 6 wherein the crop of a substantially C-like section comprises a hole for the passage of a fixing screw of the crop to the base.

8. The protection structure according to claim 1 wherein the base has a profile with an arch of predetermined width conjugated with a curve of an inner surface of the profile, and wherein adjacent arch-like portions of the base are configured to function as extension of the profile, a step being formed between the two adjacent portions having height roughly equal to the thickness of the profile.

9. The protection structure according to claim 1 wherein the tenon element has a surface with predetermined curve conjugated with a curve of an inner surface of the profile.

10. The protection structure according to claim 1 wherein the base is made of a thermoformed material such as PVC.

11. A support base for a finish profile intended for being fixed to the border of a boat hull, comprising a central and longitudinal groove for housing one of the elements of the mortise and tenon joint according to claim 1.

12. A finish profile of stainless steel, of the type intended for being fixed to the border of a boat hull, comprising a surface at sight being continuous and an opposite inner surface provided with one of the elements of the mortise and tenon joint according to claim 1.

13. The protection structure according to claim 1 wherein the limited length of the tenon element corresponds to the limited length of the mortise element.

14. A protection structure for a boat hull, comprising:
    a protective profile extended in a longitudinal direction, the protective profile having an inner surface;
    a base configured to be mounted on the hull; and
    at least one tenon and mortise joint including a tenon element and a mortise element, the profile being fixed to one of the tenon and mortise elements, and the other of the tenon and mortise elements being adapted to be fixed to the base; the tenon element and the mortise element being disengageable by longitudinally sliding one with respect to the other, wherein
    the one of the tenon and mortise elements has a surface with predetermined curve conjugated with a curve of the inner surface of the profile.

15. The protection structure according to claim 14 wherein the tenon element and the mortise element are configured to be mutually coupled by the application of pressure in a direction perpendicular to the longitudinal direction.

16. The protection structure according to claim 15 wherein the tenon element has a section with saw-tooth shaped sides and the mortise element has a section with saw-tooth shaped sides, substantially conjugated to the section of the tenon.

17. The protection structure according to claim 16 wherein the tenon element is a substantially parallelepiped block being longitudinally extended for a predetermined and limited length.

18. The protection structure according to claim 17 wherein the substantially parallelepiped block comprises a hollow area for housing a nut for a stud for fixing the tenon element to the inner surface of the profile.

19. The protection structure according to claim 17 wherein the mortise element is a crop of a substantially C-like section being longitudinally extended for a predetermined and limited length.

20. The protection structure according to claim 19 wherein the crop of a substantially C-like section comprises a hole for the passage of a fixing screw of the crop to the base.

21. The protection structure according to claim 14 wherein the base has an extruded profile having an arch of predetermined width conjugated with the inner surface of the profile, and adjacent arch-like portions as extension of the profile, a step being formed between the two adjacent portions having height equal to the thickness of the profile.

22. The protection structure according to claim 14 wherein the base comprises a longitudinal groove for receiving the mortise element.

23. The protection structure according to claim 14 wherein the base is made of a thermoformed material such as PVC.

24. A protection and finish structure for a boat hull comprising:
   a profile extended in a longitudinal direction;
   a longitudinally extended base configured for being fixed to the hull; and
   a plurality of tenon and mortise joints having tenon elements being longitudinally extended for a limited length and fixedly spaced apart from each other along one of the profile and the base, and mortise elements being longitudinally extended for a limited length and fixedly spaced apart from each other along the other of the profile and base, and wherein the tenon and mortise elements are arranged in such a way that the space between adjacent tenon elements is equal to or longer than the limited length of the mortise elements and the space between adjacent mortise elements is equal to or longer than the limited length of the tenon elements, such that by sliding the profile with respect to the base in the longitudinal direction the tenon elements and mortise elements are movable between a locked position wherein each of the tenon elements is engaged with a mortise element and an unlocked position wherein each of the tenon elements is positioned in a respective space between adjacent mortise elements and each of the mortise elements is positioned in a respective space between adjacent tenon elements.

* * * * *